(No Model.)　　　　　　　　　　　　　　　　　3 Sheets—Sheet 1.
J. LEE, Jr.
TREAD FOR HORSE POWERS.
No. 263,343.　　　　　　　　　　　Patented Aug. 29, 1882.
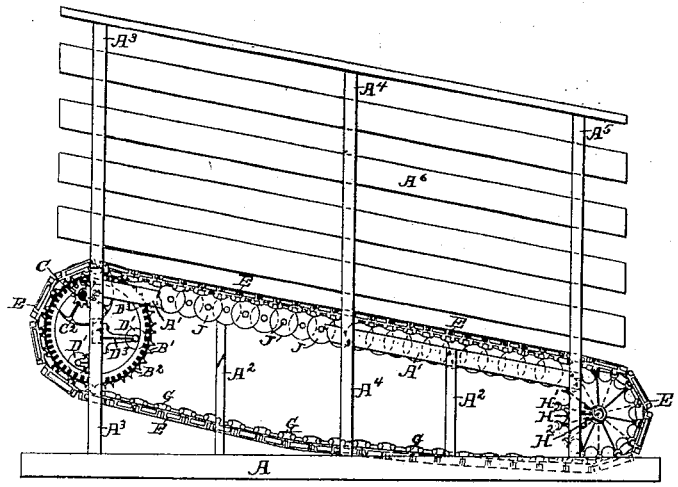
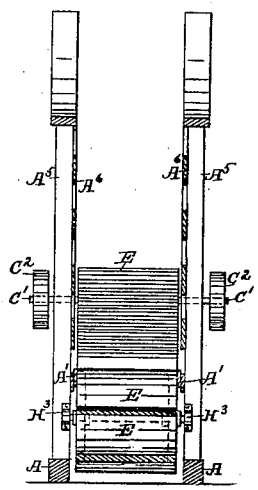
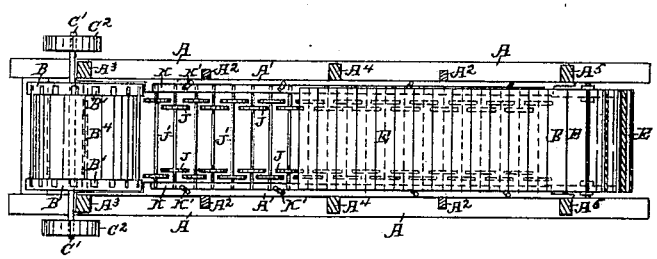

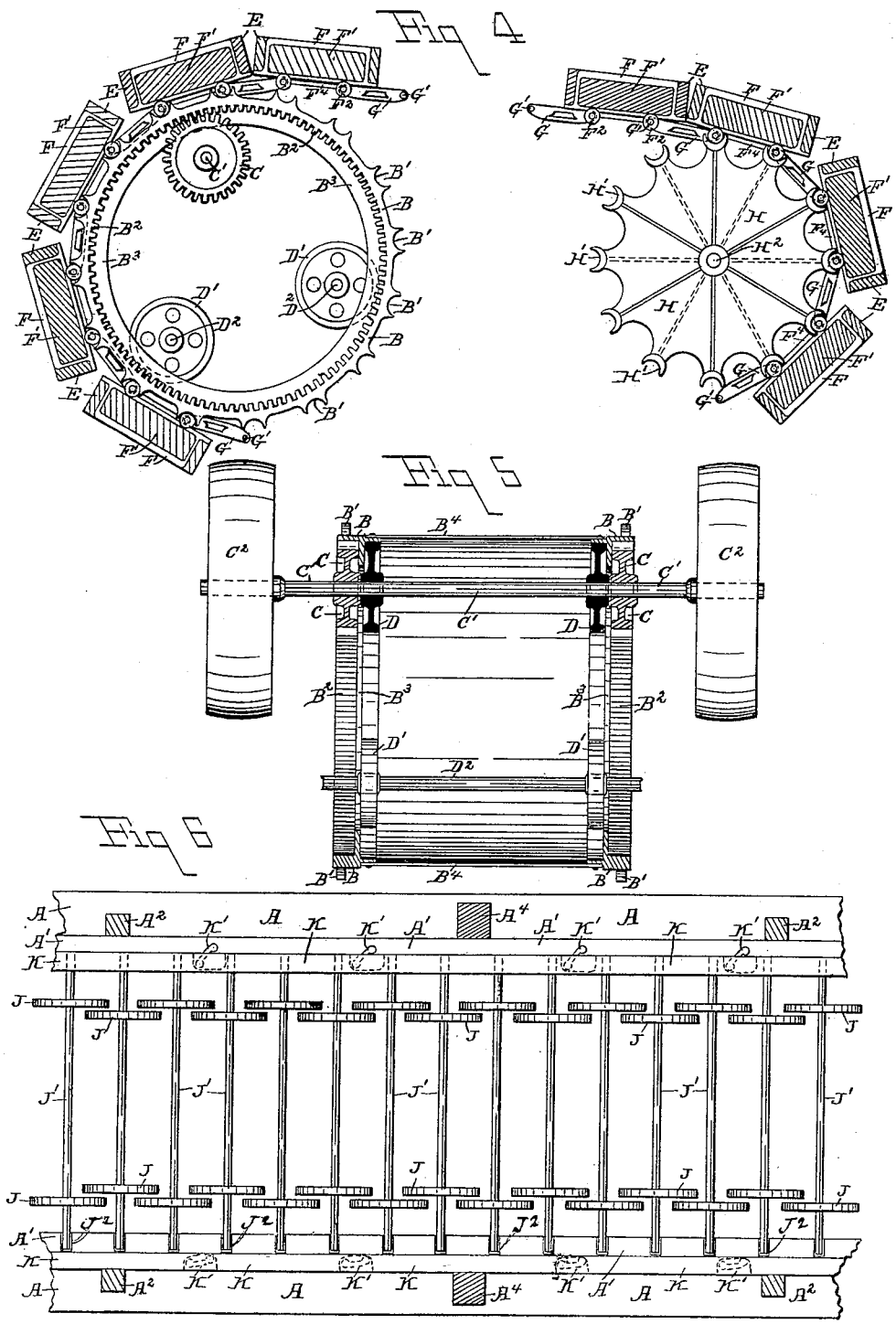

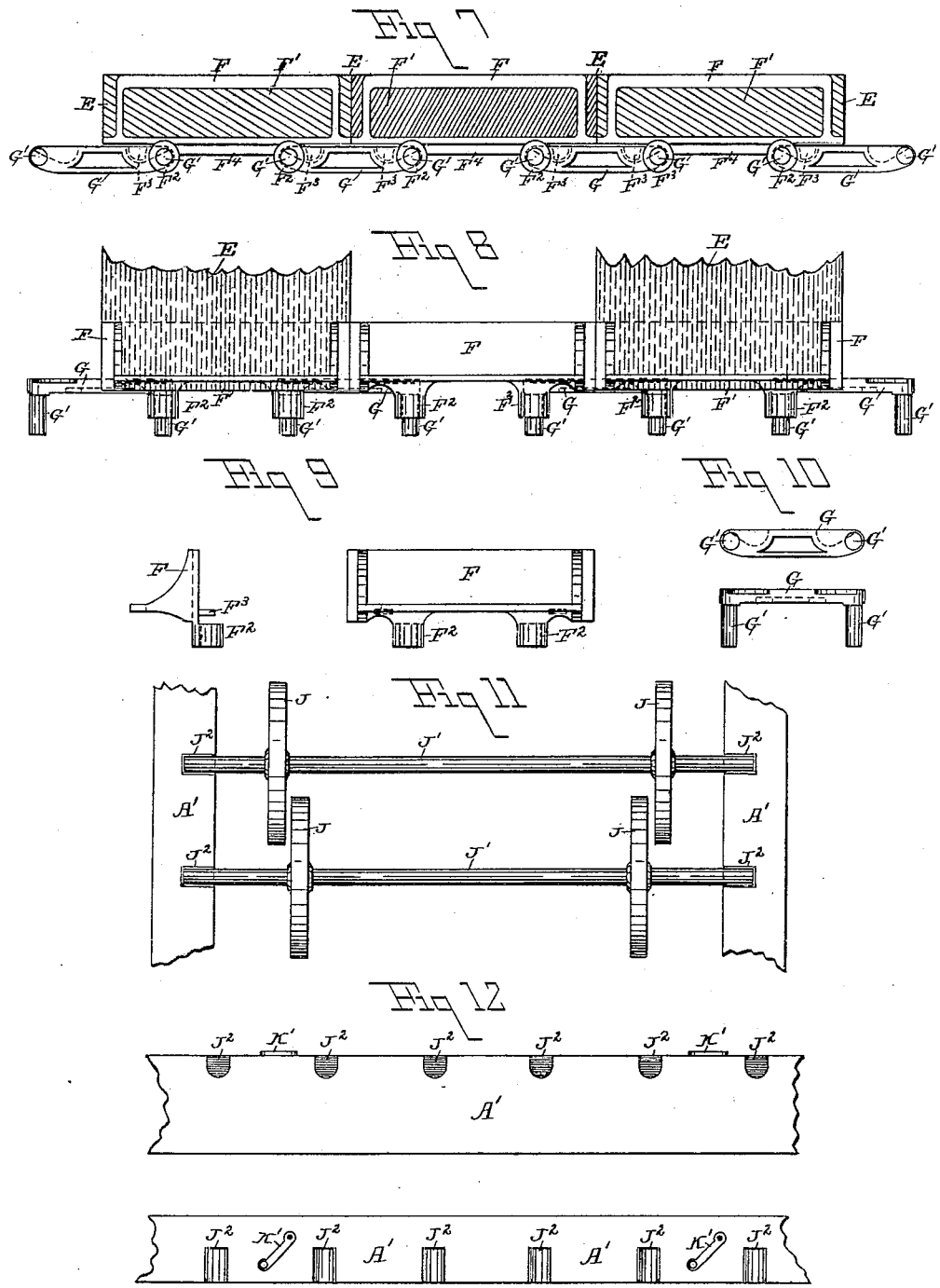

UNITED STATES PATENT OFFICE.

JAMES LEE, JR., OF STONERSVILLE, PENNSYLVANIA.

TREAD FOR HORSE-POWERS.

SPECIFICATION forming part of Letters Patent No. 263,343, dated August 29, 1882.

Application filed July 13, 1882. (No model.)

*To all whom it may concern:*

Be it known that I, JAMES LEE, Jr., of the village of Stonersville, county of Berks, State of Pennsylvania, have invented a new and useful Improvement in Tread Horse-Powers, of which the following is a specification.

This improvement relates more particularly to expedients for reduction of friction and more ease of operation, with simplification of construction, in powers of the above class.

Referring to the drawings herewith, forming part of the specification, and in which similar letters refer to similar parts, Figure 1, Sheet 1, represents a side elevation, partly in section, showing the improvement. Fig. 2, Sheet 1, represents an end view. Fig. 3, Sheet 1, is a plan of the power with part of the flooring removed. Fig. 4, Sheet 2, is a detached representation of the sprocket-drum and sprocket-spider, showing a portion of the traveling floor in combination therewith. Fig. 5, Sheet 2, is a sectional front elevation of the drum-sprocket with its pinions and anti-friction-roller supports. Fig. 6, Sheet 2, is a partial plan of the upper rail of the power, showing the movable caps of the journals and arrangement of carrying-rollers. Fig. 7, Sheet 3, represents a side elevation of the sprocket-chain as connected. Fig. 8, Sheet 3, represents a plan of the sprocket-chain as connected. Fig. 9, Sheet 3, represents a plan and end elevation of the bracket of the sprocket-chain detached therefrom. Fig. 10, Sheet 3, represents the pin or connecting-link of the sprocket-chain as detached therefrom. Fig. 11, Sheet 3, represents a partial plan of the frame and carrying-wheels. Fig. 12, Sheet 3, represents an enlarged plan of part of the top rail of the power, showing the arrangement of journal-bearings and oil-cap links.

A represents the ground-sill of the frame; A', the top rail of the frame; $A^2$, the vertical supports; $A^3$, the front posts; $A^4$, the middle posts; $A^5$, the rear posts, and $A^6$ the side rails.

B represents the sprocket-drum heads, with an offset pulley-like periphery, the outer exterior surface having seats B' raised thereon for the reception of the sprocket-chain links, and an internal spur-gear, $B^2$, a central flange or web, $B^3$, and are connected transversely with a light sheet-iron or wooden shell, $B^4$. Spur-pinions C gear on the opposite sides of the machine with the internal gears, $B^2$, and are mounted on a shaft, C', common to both pinions. On the outer ends of the shaft are band-pulleys $C^2$, and it is secured to the posts $A^3$ by clamp-boxes, as usual.

D D are anti-friction-roller supports for the drum-heads B, mounted loosely upon the pinion-shaft C' and placed on the opposite side of the central web, $B^3$, from the pinion C, with their peripheries in contact with the internal face of the drum-head rim, the internal face of drum-head, where it bears upon the anti-friction rollers D D, being beveled or flared in the pattern to withdraw it from the mold. The rollers D D are reverse beveled upon their peripheries at an equal angle therewith, and thus carry the drum evenly upon their rims. D' D' are similar anti-friction rollers, mounted upon shafts $D^2$ and supported in bearings $H^3$, arranged so as to support and steady the motion of the drum-heads B.

The floor E is of hard-wood planking, as usual, cut into strips of the proper width and length, and shouldered and tenoned to fit the female links of the sprocket-chain.

F represents the floor-bracket or eye-link pieces of the sprocket-chain. They are provided with a mortise, F', for the floor-tenon, and with two bosses, $F^2 F^2$, which are bored for the reception of the pins of the connecting-links.

$F^3 F^3$ are stops so arranged upon the base of the bracket that when the chain is in its normal operating position the link connecting-pieces cannot separate therefrom.

$F^4$ are braces for strengthening the bracket.

G represents the connecting-link, having pins G', which are turned to fit the eye-link holes $F^2$ of the bracket F. The chain is connected by raising the opposite ends of two opposing brackets, F, at a sufficient angle, when the pins G' of the links G are inserted. On dropping the pieces the link G will fall between the boss $F^2$ and the stop $F^3$, and cannot be removed from the chain without reversing the operation.

H H are the rear sprocket-spiders, having pockets H' on the ends of the arms for the sprocket-chain bosses, and are mounted upon a shaft, H², having its bearing in brackets H³ upon the rear posts, A⁵.

The supporting or carrying floor-rollers J are so arranged alternately with each other as to present an almost unbroken level for the floor to rest upon. The wheels are permanently secured to the shaft J', and have their support in recessed bearings J² in the inner upper edge of the top rail, A'. The recesses J² are bored from the inner face of the top rails, A', to the depth of the journal's length, and are then cut square down in line with the center from the top face, which permits the dropping of the shafts J' into place.

In operation the journals are covered by wooden or metal caps K, which may be in one, two, or more lengths. They are secured to the top rails by links K', two to each cap, so arranged with respect to length and position that the caps will slide around on the link-pivots so as to clear the journals and allow inspection and oiling of the same. The links K' are recessed into the caps K, the recesses being so arranged as to limit the movement of the caps.

It will be seen on examination of the drawings and specification that my improvement in supporting the sprocket-drums and carrying the floor upon non-traversing rollers avoids a large percentage of the friction attendant upon the use of tread-powers and relieves the animal of the useless labor connected with the revolution of an endless floor, which carries with it in its revolution the rollers, which serve as its support when passing under the feet of the animal operating the same. The floor-carrying rollers, being fixed upon their respective shafts and restricted in end movement by the pocket-bearings J², in which the shaft-journals are placed, cannot impart any wabbling movement to the floor, so common with the floors of traversing roller-supports, while the alternate spacing of the rollers upon the shafts permits a much more stable support to the floor by increasing the points of contact beyond anything obtainable with rollers arranged in a direct line. From the width which my arrangement permits the floor-treads to assume I obtain greater strength, fewer pieces, and more durability of floor.

All the parts are easy of access and may be speedily renewed.

Having described my improvement, its construction and mode of adaptation for the purpose required, I desire to secure by Letters Patent the following claims:

1. The concentric ring drum-heads B, provided with peripheral seats B', an internal gear, B², central web, B³, connected transversely by sheet-iron or wooden shell B⁴, adapted to be revolved by the endless floor E, supported, guided, and retained in place by anti-friction rollers D D', web B³, and pinions C, in combination with shafts C' D², floor E, chain F G, carrying-rollers J, shafts J', sprocket-spiders H, and frame A A', substantially as shown, and for the purpose set forth.

2. A series of shafts, each provided with rollers, the space between each alternate pair of which varies, whereby the bearing-points beneath the endless floor E is increased, said rollers being permanently secured to their shafts, in combination with bearings J², caps K, and floor E, substantially as shown and described.

3. The combination of two fixed spur-pinions, C C, and two loose or free anti-friction rollers, D D, and band-wheels C² upon one shaft, C', supported in bearings on posts A³, with concentric drum-web B³, sprocket drum-head B, seats B', endless floor E, chain F G, rollers J, shafts J', and sprocket-spiders H, substantially as and for the purpose hereinbefore set forth.

4. An endless chain for tread-powers or for an analogous purpose, composed of the following elements, combined and adapted to be used as shown and described, to wit: an eye bracket or link, F, having a mortise, F', offset bosses or pads F², ribs F³, and stops F⁴, the bosses F² bored to receive the pins G' of the links G, in combination therewith, and with the floor E, sprocket-drum B, sprocket-spiders H, carrying-rollers J, anti-friction rollers D D', pinion C, and band-wheels C², whereby the power of the animal is transferred from the floor E to the machinery to be operated thereby, as and for the purpose set forth.

5. The combination of the bearings J² for the carrying-wheel shaft J', arranged in the upper inner face of the rail A' of the tread-power frame, with the caps K, of wood or metal, adapted by links K', in connection therewith and with the top rail, A', to cover or uncover the bearing-seats J², whereby the introduction of the shaft J' and the oiling of the shaft-journals are facilitated, substantially as and for the purpose specified.

JAMES LEE, JR.

Witnesses:
THOMAS P. KINSEY,
F. PIERCE HUMMEL.